United States Patent [19]

Lindahl

[11] Patent Number: 4,532,531

[45] Date of Patent: Jul. 30, 1985

[54] ELECTROGRAPHIC RECORDING APPARATUS

[75] Inventor: Richard W. Lindahl, Hudson, Wis.

[73] Assignee: Minnesota Mining and Manufacturing Company, St. Paul, Minn.

[21] Appl. No.: 494,623

[22] Filed: May 16, 1983

[51] Int. Cl.[3] .................... G01D 15/06

[52] U.S. Cl. .................... 346/153.1; 118/652; 118/657

[58] Field of Search .................... 346/153.1; 118/639, 118/652, 657, 658; 355/3 DD; 430/122

[56] References Cited

U.S. PATENT DOCUMENTS

| | | | |
|---|---|---|---|
| 3,879,737 | 4/1975 | Lunde | 346/153.1 |
| 3,946,402 | 3/1976 | Lunde | 346/153.1 |
| 4,418,357 | 11/1983 | Huss | 346/153.1 |
| 4,464,672 | 8/1984 | Lindahl | 346/153.1 |

*Primary Examiner*—Thomas H. Tarcza
*Attorney, Agent, or Firm*—Donald M. Sell; James A. Smith; Robert L. Marben

[57] ABSTRACT

An electrographic stylus recording apparatus wherein magnetically attractable toner material is moved from a toner material dispensing apparatus to a nonrotatable cylindrical sleeve bearing an imaging stylus array where a rotatable magnetic means within the sleeve functions to move the toner material to the stylus array with excess and nonimaging toner continuing to a flange means on the sleeve which directs the toner material to at least one chute for return to the toner dispensing apparatus. Electrical conductors for the stylus array extend from the stylus array and about the sleeve to a position between the flange means and the toner dispensing means where the conductors are positioned to extend outwardly in a generally radial direction from the sleeve for connection to driver circuits.

3 Claims, 2 Drawing Figures

ELECTROGRAPHIC RECORDING APPARATUS

BACKGROUND OF THE INVENTION

1. Field of the Invention

The present invention relates to electrographic stylus recording apparatus for the recording of toner images on a recording medium wherein a plurality of magnets are adapted for rotation within a nonrotatable cylindrical sleeve with the recording stylus array for the apparatus mounted on the outer surface of such sleeve, the invention relating to structure providing for removal of excess and nonimaging toner from the sleeve and the manner in which the stylus array and associated electrical conductors are mounted relative to the toner dispensing apparatus.

2. Description of the Prior Art

U.S. Pat. No. 3,879,737 to Lunde discloses an electrographic stylus recording apparatus for the recording of toner images wherein a plurality of magnets are adapted for rotation within a nonrotatable cylindrical sleeve with the recording stylus array for the apparatus mounted on the outer surface of such sleeve. FIG. 3 of the patent shows how the electrical conductors for the stylus array are brought to and extend beyond the ends of the sleeve for connection to driver circuits used with the stylus array. Since the toner that is carried about the sleeve due to the rotation of the magnets within the sleeve moves about the entire circumference of the sleeve, it is necessary that the electrical conductors for the stylus array be brought to and extend beyond the ends of the sleeve. This arrangement presents a problem with respect to the use of etching technology for forming the electrical conductors. When a high density stylus array is to be used, such as 80 styli per centimeter, the length required for the conductors for an arrangement as disclosed in the Lunde patent is typically too great for the amount of reduction that is needed for the art work used in an etching process. In addition, the apparatus of the Lunde patent provides little control over the amount of toner material that is brought to the sleeve on which the stylus array is mounted. It has been found also that such an arrangement for bringing the toner material to the recording region at the stylus array does not provide adequate control of the amount and movement of the toner material to the recording region particularly when a high density stylus array is used.

U.S. Pat. No. 3,946,402 to Lunde discloses a toner applicator arrangement which overcomes the toner material control deficiency of the apparatus disclosed in the first above-mentioned U.S. patent to Lunde. The apparatus disclosed in U.S. Pat. No. 3,946,402 accurately meters an optimum level of toner from a toner supply onto a recording member which moves to present the toner material to a recording region presented between the recording member and a stylus array allowing high quality, high resolution toner images to be formed. Excess toner plus nonrecorded or unused toner material is magnetically removed from the recording member and from the recording region at the stylus array by rotating magnets within a cylindrical sleeve on which the stylus array is mounted. The removed toner moves over the surface of the sleeve to a blade which scrapes the toner from the sleeve allowing it to fall by gravity back to the toner supply hopper. Since the recording member is pre-toned by this arrangement to bring toner to the recording region, considerable nonimaging background toner material remains on the recording member, particularly on recording members presenting a relatively rough surface, such as paper. In addition, such an arrangement does not provide a solution to the problem presented with respect to disposition of the electrical leads for a high density stylus array.

SUMMARY OF THE INVENTION

The invention presented herein avoids the problems and deficiencies of prior art electrographic stylus recording apparatus adapted for use with magnetically attractable, electronically conductive toner material which is of the type having a nonrotatable cylindrical sleeve of non-magnetic material with an imaging stylus array, which has an insulated electrical conductor for each stylus, positioned axially of and at the outer surface of the sleeve and a rotatable magnetic means disposed for rotation in one direction within the sleeve. The invention provides for the imaging stylus array to be positioned so the electrical conductors of the imaging stylus array surround the cylindrical sleeve for a portion of the circumference of the cylindrical sleeve in the same direction as the direction of rotation of the rotatable magnetic means with an end portion of each of the electrical conductors positioned between the ends of the cylindrical sleeve and extending in a generally radial direction away from the outer surface of the cylindrical sleeve. The apparatus of the invention also includes a toner material dispensing means positioned near the portion of the electrical conductors extending away from the outer surface of the cylindrical sleeve. The toner material dispensing means includes a hopper for receiving a supply of toner material. The rotatable magnetic means magnetically attracts toner material from the toner dispensing means and moves such attracted toner material to the imaging stylus array in response to rotation of the rotatable magnetic means. The apparatus of the invention further includes a flange means spirally disposed at the outer surface of the cylindrical sleeve and extending to at least one end portion of the cylindrical sleeve plus a pathway means positioned between the hopper and the flange means at the one end portion of the cylindrical sleeve. Toner material that is moved beyond the stylus array travels over the outer surface of the cylindrical sleeve due to the rotation of the rotatable magnetic means to the flange means. Such toner material moves along the flange means to the pathway means and falls by gravity along the pathway means into the hopper.

A preferred form for the toner material dispensing means of the apparatus includes a rotatable cylindrical sleeve within which a stationary magnetic means is disposed. The rotatable cylindrical sleeve is positioned close to the nonrotatable cylindrical sleeve carrying the stylus array and also close to an opening in the hopper so toner material in the hopper is magnetically attracted to the rotatable cylindrical sleeve and carried toward the nonrotatable cylindrical sleeve allowing toner material to be magnetically transferred from the rotatable cylindrical sleeve to the nonrotatable cylindrical sleeve and moved to the stylus array in response to the rotatable magnetic means within the nonrotatable cylindrical sleeve. A blade member may also be included which is positioned close to the outer surface of the rotatable cylindrical sleeve. Control of the amount of toner transferred to the nonrotatable cylindrical sleeve for the stylus array can be attained by adjustment of one or more of the various factors present in such an arrangement that relate to such control. Such factors include speed of the rotatable cylindrical sleeve, the gap present between the rotating cylindrical sleeve and the nonrotatable cylindrical sleeve for the stylus array, the angular position of the magnet means within the rotatable cylindrical sleeve and the position of a blade member, when used, relative to the rotatable cylindrical sleeve.

Brief Description of the Drawings

A better understanding of this invention, including its novel features and advantages, will be obtained upon consideration of the following detailed description and accompanying drawings wherein.

DETAILED DESCRIPTION

Figure 1:
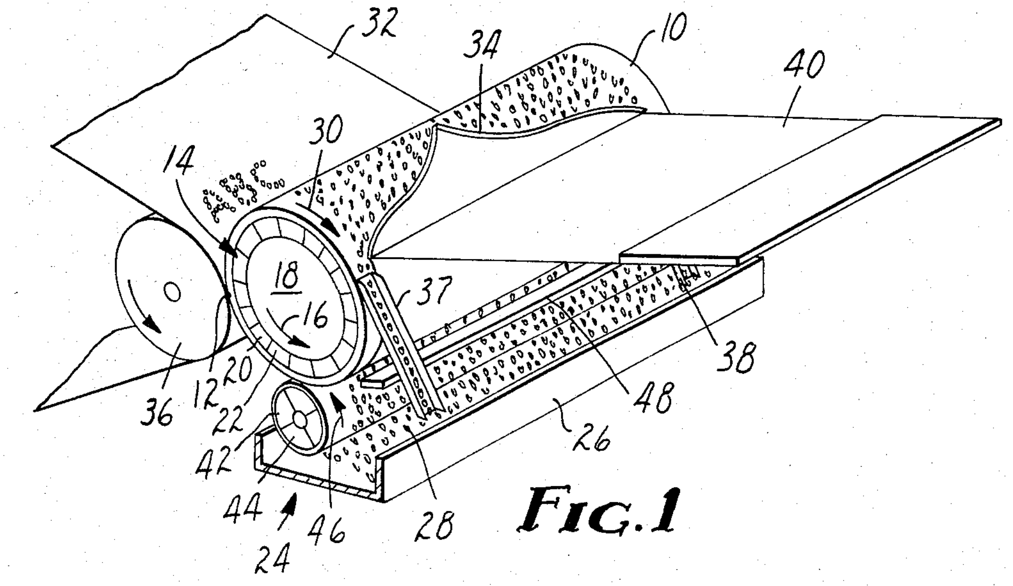
FIG. 1 is a perspective view of apparatus with some portions removed illustrating a preferred embodiment of the invention.
Figure 2:
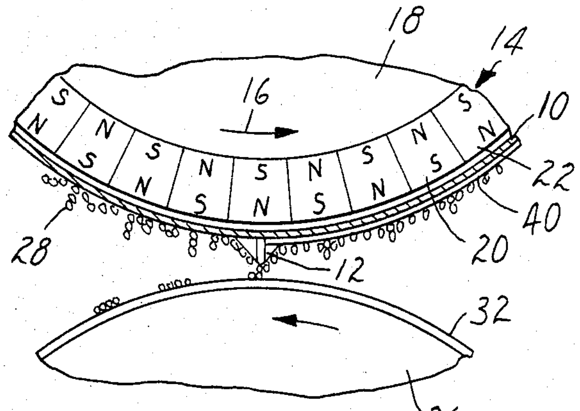
FIG. 2 is an end view of the apparatus of FIG. 1.

Referring to FIG. 1, a preferred embodiment of electrographic stylus recording apparatus according to the present invention is shown which is adapted for use with magnetically attractable, electronically conductive toner material. The apparatus includes a nonrotatable cylindrical sleeve 10 of nonmagnetic material, such as aluminum, to which an imaging stylus array 12 (see FIG. 2) is positioned axially of and at the outer surface of the sleeve 10. A rotatable magnetic assembly 14 is disposed for rotation about its axis in one direction and is coaxially positioned within the sleeve 10. As indicated by arrow 16, counterclockwise rotation is used for the magnetic assembly 14. The rotatable magnetic assembly can be driven by a motor drive (not shown). The rotatable magnetic assembly 14 is used to present alternate magnetic poles at the inner surface of the sleeve 10. More specifically, the rotatable magnetic assembly 14 includes an iron core member 18 and a plurality of permanent magnets 20 and 22 alternately positioned about the periphery of the iron core 18 and extending axially of the iron core 18. The magnets 20 and 22 are polarized to have a different magnetic pole on the outer surface than on the inner surface. Referring to magnet 20, the north pole is at the outer surface, while the south pole is at the inner face of the magnet 20. The magnets 22 are polarized so the north pole is on the inner face and the south pole at the outer surface. In this manner, the magnets 20 and 22 provide alternate north and south magnetic poles about the periphery of the rotatable magnetic assembly 14. Only a slight gap is presented between the outer surface of the magnets 20 and 22 and the inner surface of the nonrotatable cylindrical sleeve 10. The magnets 20 and 22 extend parallel to the axis of the core member 18 with each magnet presenting a magnetic field that is substantially uniform along its length. For a 9 cm diameter cylindrical sleeve 10, a rotatable magnetic assembly 14 as described, has been constructed using a total of about 40 permanent magnet members 20 and 22. The multiple pole, segmented magnetic assembly 14 provided by the core member 18 and the magnets 20 and 22, is operated at a high speed, for example 2000 rpm. The nonrotatable cylindrical sleeve 10 is preferably formed from an electrically nonconductive, nonmagnetic material to avoid the generation of heat due to eddy currents that would otherwise result from the rapid rotation of the magnetic assembly 14.

The apparatus of FIG. 1 also includes a toner dispensing means 24 having a hopper 26, shown with an end wall removed, for receiving a supply of electrically conductive, magnetically attractable toner material 28. The toner dispensing means 24 functions to present toner material to the cylindrical sleeve 10 so the toner material can be attracted toward the sleeve 10 by the magnetic force established by the rotatable magnetic assembly 14. Toner material 28 attracted to the sleeve 10 moves clockwise about the sleeve 10, as indicated by the arrow 30, due to the counterclockwise rotation of the rotatable magnetic assembly 14. The toner material is carried over the stylus array 12 where, as will be explained, some of the toner material is deposited imagewise on the surface of a dielectric receptor 32 that is positioned and adapted to be moved past and close to the stylus array 12 so that the toner material 28 bridges the space between the stylus array 12 and the surface of receptor 32. Excess and nonimaging toner material is moved beyond the stylus array 12 and about the sleeve 10 in a clockwise direction bringing it to a toner removal means that is provided as a part of the apparatus. The toner removal means serves to remove that toner material that is brought to it via the sleeve 10 and return it to the toner hopper 26. The toner removal means includes a flange member 34 that is carried on the surface of the sleeve 10. One portion of the flange member 34 is mounted in a spiral fashion and extends from about the center of the longitudinal length of the sleeve 10 to one edge of the sleeve 10 with another portion of the flange member 34 similarly arranged to extend to the other end of the sleeve 10. A chute or trough 37 extending from a position near the toner hopper 26 to the flange portion at one end of the sleeve 10 provides a return pathway to the hopper 26 for the toner that is directed to the end of the sleeve 10 by the flange member 34. A similar chute 38 is provided for the portion of the flange structure 34 that extends to the other end of the sleeve 10 to provide a return pathway to the hopper 26 for toner collected by that portion of the flange structure 34. The toner removal means thus provides the apparatus needed for removing toner that is moved about the sleeve 10 from the stylus array 12 providing for the return of such toner to the hopper 26 for reuse by the apparatus.

While the preferred arrangement for toner removal means has the flange member 34 arranged to direct toner material to both ends of the sleeve 10 to chutes 37 and 38, the flange member 34 can be mounted in a spiral fashion so that it extends from one end of the sleeve 10 to the other to bring toner material to only one chute for return of the toner material to the hopper 26.

An electrical conductor is provided for each stylus in the stylus array 12. All of such electrical conductors are indicated at 40 and are brought out to an area where they can be connected to driver circuits (not shown) that are used to selectively apply a voltage between the various styli and an electrode 36 that provides electrical contact with the dielectric receptor 32 in order that toner material will be deposited on the receptor 32 opposite the styli which receives the voltage. As shown in FIG. 1, the electrode 36 makes contact with the side of the dielectric receptor 32 which does not receive toner material. It should be appreciated that the present invention is not limited to an arrangement wherein the dielectric receptor 32 is provided in sheet form as shown in FIG. 1. The dielectric member can be formed on or secured to the surface of the electrode 36. Such an arrangement would require the toner image to be transferred from the dielectric if a copy of the image is desired.

The electrical conductors 40 are insulated from each other and from the sleeve 10 and extend from the stylus 12 about the sleeve 10 in a direction opposite to the movement of toner material to bring them to a position between the flange member 34 and toner dispensing means 24 where they are positioned to extend outwardly in a generally radial direction from the outer surface of the sleeve 10 for connection to driver circuits (not shown) as mentioned earlier.

Returning to the toner dispensing means 24, which has been mentioned but not described in detail, a rotatable cylindrical sleeve 42, which functions as a toner material applicator, is included and is positioned lengthwise and close to the cylindrical sleeve 10. A stationary multipole magnetic stator 44 is positioned coaxially within the sleeve 42. The magnetic stator 44 serves to attract the toner material 28 from the hopper 26 to the sleeve 42 and rotation of sleeve 42 carries the toner material close to the sleeve 10 where the magnetic force provided by the magnets 20 and 22 is strong enough to move toner material at the sleeve 42 to the sleeve 10. A doctor blade 48 can be used that is positioned parallel to and near the sleeve 42 to control the amount of toner material that is moved from the hopper 26 to the sleeve 10 by rotation of sleeve 42 which, in the arrangement of FIG. 1, is counterclockwise, as indicated by the arrow 46.

This preferred structure for the toner dispensing means 24 provides for a number of adjustments that can be made to control the amount of toner material that reaches the sleeve 10 for movement to the stylus array. One such adjustment is of the gap presented between the sleeve 10 and the sleeve 42. Another factor affecting the flow of toner material is the magnitude of the magnetic field present at the surface of the sleeve 42 at the area where toner is removed from the sleeve 42 and attracted to the sleeve 10. Slight rotation of the magnetic stator 44 will cause an increase or decrease in the magnetic field at the area mentioned. The speed of rotation of the sleeve 42 affects the amount of toner material that reaches the sleeve 10 and can be varied to control the flow of toner. The gap between the doctor blade 48 and the sleeve 42 controls the amount of toner that reaches the sleeve 10. This gap can be varied by movement of the doctor blade 48.

It can be appreciated that the apparatus that has been described can be used in applications where the surface speed of the dielectric receptor 32 is variable, since the quantity of toner metered to the stylus array 12 can be controlled to assure an optimum supply of toner material by automatic adjustment of one or more of the possible adjustments mentioned above that affect the flow of toner material to the stylus array 12.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

What is claimed is:

1. An electrographic stylus recording apparatus for use with magnetically attractable, electronically conductive toner material including:

a nonrotatable cylindrical sleeve of nonmagnetic material;

a rotatable magnetic means disposed for rotation about its axis in one direction within said nonrotatable cylindrical sleeve, said rotatable magnetic means including alternate magnetic poles presented adjacent the inner surface of said nonrotatable cylindrical sleeve;

an imaging stylus array positioned axially of and at the outer surface of said nonrotatable cylindrical sleeve, said imaging stylus array including an insulated electrical conductor for each stylus of said imaging stylus array extending from the stylus array and positioned about the outer surface of said nonrotatable cylindrical sleeve for a portion of the circumference of said nonrotatable cylindrical sleeve with an end portion of each of said conductors positioned between the ends of said nonrotatable cylindrical sleeve and extending in a generally radial direction away from the outer surface of said nonrotatable cylindrical sleeve;

a toner material dispensing means positioned near the portion of said electrical conductors positioned about said nonrotatable cylindrical sleeve and between said imaging stylus array and the end portion of each of said electrical conductors extending away from the outer surface of said nonrotatable cylindrical sleeve, said toner material dispensing means including a hopper for receiving a supply of toner material that is magnetically attractable and electronically conductive, said rotatable magnetic means attracting toner material from said toner dispensing means to said nonrotatable cylindrical sleeve and moving such attracted toner material to said imaging stylus array in response to rotation of said rotatable magnetic means;

a flange means spirally disposed at the outer surface of said nonrotatable cylindrical sleeve and extending to at least one end portion of said nonrotatable cylindrical sleeve for receiving toner material that is moved beyond said imaging stylus array and over the outer surface of said nonrotatable cylindrical sleeve when said rotatable magnetic means is rotated; and pathway means positioned between said hopper and said flange means providing a pathway to allow the toner material received at said flange means to fall by gravity into said hopper from said flange.

2. An electrographic stylus recording apparatus according to claim 1 wherein said toner material dispensing means includes a rotatable cylindrical sleeve having a magnetic means disposed therein, said rotatable cylindrical sleeve disposed lengthwise and close to said nonrotatable cylindrical sleeve for attracting toner material from said hopper to said rotatable cylindrical sleeve for subsequent movement toward and attraction by said rotatable magnetic means to said nonrotatable cylindrical sleeve.

3. An electrographic stylus recording apparatus according to claim 2 wherein said toner material dispensing means includes a doctor blade positioned lengthwise and close to said rotatable cylindrical sleeve for controlling the amount of toner material attracted from said toner dispensing means to said nonrotatable cylindrical sleeve.

* * * * *